No. 709,147. Patented Sept. 16, 1902.
L. P. FAY.
COTTON CHOPPER.
(Application filed July 1, 1902.)
(No Model.)

Witnesses L. P. Fay, Inventor.
by C. A. Snow & Co.
Attorneys

UNITED STATES PATENT OFFICE.

LOUIS PERCY FAY, OF DENISON, TEXAS.

COTTON-CHOPPER.

SPECIFICATION forming part of Letters Patent No. 709,147, dated September 16, 1902.

Application filed July 1, 1902. Serial No. 113,948. (No model.)

*To all whom it may concern:*

Be it known that I, LOUIS PERCY FAY, a citizen of the United States, residing at Denison, in the county of Grayson and State of Texas, have invented a new and useful Cotton-Chopper, of which the following is a specification.

This invention relates to cotton-choppers; and it has for its object to provide a device of this class adapted to operate crosswise with relation to the rows which shall possess superior advantages in point of simplicity, durability, and general efficiency.

With these ends in view the invention consists in the improved construction, arrangement, and combination of parts which will be hereinafter fully described, and particularly pointed out in the claims.

Figure 1:
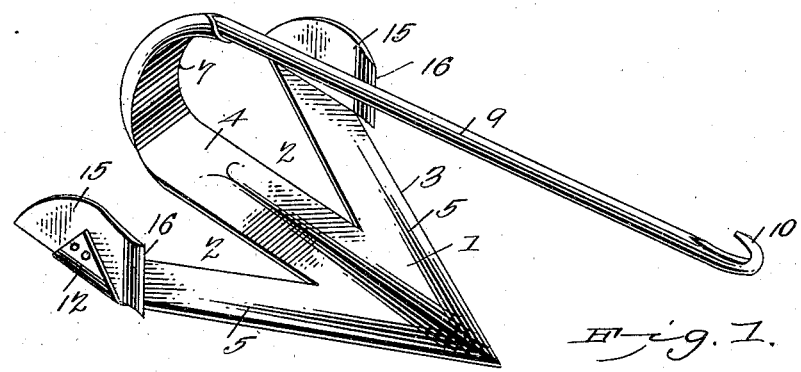
Figure 2:
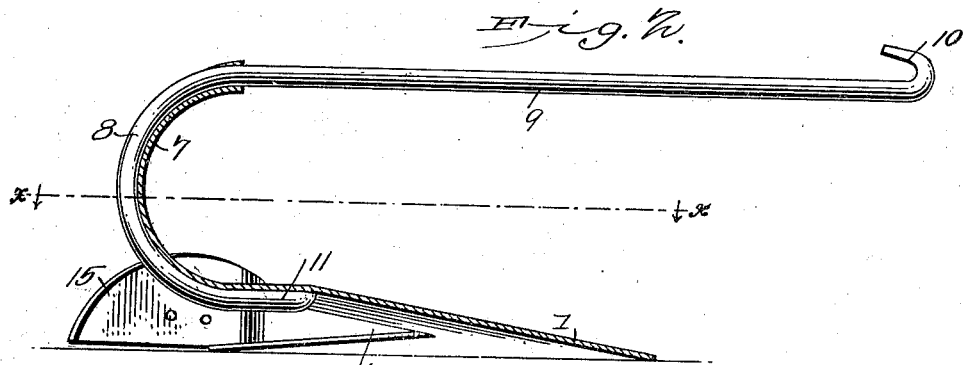
Figures 3, 4:
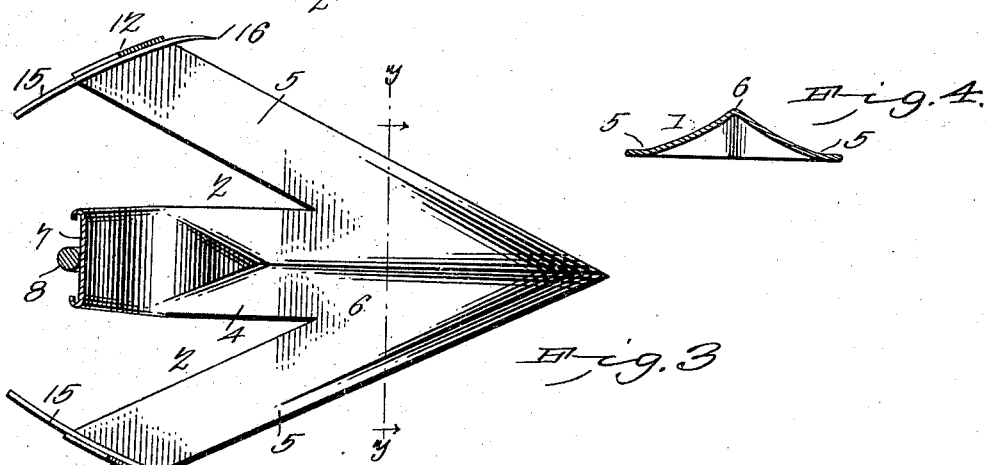

In the accompanying drawings, Figure 1 is a perspective view showing a cotton-chopper constructed in accordance with my invention. Fig. 2 is a longitudinal sectional view of the same. Fig. 3 is a horizontal sectional view taken on the line $x\,x$ in Fig. 2 and looking in a downward direction. Fig. 4 is a transverse sectional view taken on the line $y\,y$ in Fig. 3 and looking in a forward direction.

Corresponding parts in the several figures are indicated by like characters of reference.

The main portion or blade of my improved cotton-chopper, which is preferably constructed of sheet-steel, consists of a V-shaped body 1, provided at the rear portion thereof with two approximately V-shaped incisions or recesses 2 2, the sides of which are approximately parallel to the outer edges 3 and to the longitudinal axis of the main body. Three wings are thus formed, the central wing being designated 4 and the two outer wings 5 5.

The main body 1 is formed with a central longitudinal ridge 6, making the said body approximately inverted-V-shaped in cross-section, as will be clearly seen in Fig. 4 of the drawings. The central wing 4 is bent or curved in an upward and forward direction, as will be clearly seen at 7, and is partially bent around, so as to clamp and hold securely in its position the curved rear end 8 of the draft bar or beam 9, which may consist of an iron rod, provided at its front end with a hook 10 for the attachment of the draft.

The curved rear end 8 of the draft-bar is extended at 11 under the central portion of the blade, being accommodated under the ridge 6 of the latter.

The side wings 5 5 of the device are bent upwardly at their rear ends to form brackets 12 12, which converge in a rearward direction, and to the inner sides of these brackets are secured the vertically-disposed cutters 15 15, having sharp front edges 16 and which are curved or converged rearwardly, as clearly shown in Fig. 3, so as to take a firm hold upon the plants removed from the row by my improved device and assist in dragging them clear of the row. The said sharp front edges 16 of the cutters 15 are extended beyond the outer edges 3 of the wings, so as to supplement the shearing action of the latter with a cutting action that shall separate the plants which it is desired to remove from those that are to be left standing and prevent injury to the latter. It is obvious that the extreme width of the device is to be equal to the width of the space to be cleared from plants.

The operation of this device will be readily understood from the foregoing description, taken in connection with the drawings hereto annexed. The chopper is dragged over the ground transversely to the rows of plants by draft attached to the front end of the beam. The point of the blade may be depressed sufficiently to engage the rows at any desired depth, and the outer edges of the wings 5 will shear under the plants, thus removing them from the row and causing the portion removed to slide up the inclines formed by the central ridge, which also serves to divide the said removed portion, which is deposited upon the ground through the spaces between the central and the outer wings. Such deposit, however, will not take place until the plants have been dragged a sufficient distance from the rows by the converging rear ends of the cutters 15.

I prefer that the implement should be made of such a length that when its point engages one row the cutters shall engage and finish the operation upon the preceding row of plants. The draft will thereby be equalized and will at all times be lighter than if the operation were performed upon a single row at a time.

Handles whereby the device may be steered may be supplied, if desired, but are not considered necessary. The general construction of my improved cotton-chopper is extremely simple and inexpensive, and the parts composing the same are mutually well braced to enable them to withstand any strain to which they may be subjected.

Having thus described my invention, I claim and desire to secure by Letters Patent of the United States—

1. In a cotton-chopper, a blade consisting of a central longitudinal and two outer diverging wings, said central wing being extended upwardly and forwardly and partially clamped around the curved rear portion of a draft-rod, substantially as set forth.

2. In a cotton-chopper, a blade consisting of a central longitudinal and two outer diverging wings, said blade being formed with a central longitudinal ridge and said central wing being extended upwardly and forwardly and partially clamped around the curved rear portion of a draft-rod, said curved portion being extended under the ridged central portion of the blade, substantially as set forth.

3. In a cotton-chopper, a blade having rearwardly-diverging wings provided with upturned rear ends forming brackets, and blades secured to said brackets and having cutting edges extending beyond the outer edges of the rearwardly-diverging wings, substantially as set forth.

4. In a cotton-chopper, a blade having rearwardly-diverging wings provided with upturned rear ends forming brackets, and blades secured to said brackets, converging rearwardly, and provided at their front ends with cutting edges extending beyond the outer edges of the rearwardly-diverging wings, substantially as set forth.

In testimony that I claim the foregoing as my own I have hereto affixed my signature in the presence of two witnesses.

LOUIS PERCY FAY.

Witnesses:
N. C. BALL,
WM. F. SMITH.